United States Patent
Baldemair et al.

(10) Patent No.: US 12,500,688 B2
(45) Date of Patent: *Dec. 16, 2025

(54) FEEDBACK SIGNALING FORMAT SELECTION

(71) Applicant: Telefonaktiebolaget LM Ericsson (publ), Stockholm (SE)

(72) Inventors: Robert Baldemair, Solna (SE); Jung-Fu Cheng, Fremont, CA (US); Stefan Parkvall, Bromma (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/407,999

(22) Filed: Jan. 9, 2024

(65) Prior Publication Data

US 2024/0146445 A1    May 2, 2024

Related U.S. Application Data

(63) Continuation of application No. 16/933,389, filed on Jul. 20, 2020, now Pat. No. 11,888,609, which is a
(Continued)

(51) Int. Cl.
*H04L 1/00* (2006.01)
*H04L 1/1607* (2023.01)
(Continued)

(52) U.S. Cl.
CPC ............ *H04L 1/0013* (2013.01); *H04L 1/001* (2013.01); *H04L 1/1607* (2013.01);
(Continued)

(58) Field of Classification Search
CPC ..... H04L 1/0013; H04L 1/001; H04L 1/1607; H04L 1/1812; H04L 1/1861;
(Continued)

(56) References Cited

U.S. PATENT DOCUMENTS

| | | |
|---|---|---|
| 2010/0058136 A1 | 3/2010 | Lee et al. |
| 2010/0135181 A1 | 6/2010 | Earnshaw et al. |

(Continued)

FOREIGN PATENT DOCUMENTS

| | | |
|---|---|---|
| CN | 102792619 A | 11/2012 |
| CN | 103650393 A | 3/2014 |

(Continued)

OTHER PUBLICATIONS

International Search Report and Written Opinion dated May 17, 2018 for International Application No. PCT/SE2017/050710 filed on Jun. 27, 2017, consisting of 10-pages.

(Continued)

*Primary Examiner* — Noel R Beharry
*Assistant Examiner* — Wilfred Thomas
(74) *Attorney, Agent, or Firm* — Weisberg I.P. Law, P.A.

(57) ABSTRACT

There is disclosed a method of operating a user equipment in a radio access network. The method includes transmitting control information utilizing a control information format, the control information format being selected from a plurality of different control information formats based on a format indication. The disclosure also pertains to related devices and methods.

3 Claims, 4 Drawing Sheets

Related U.S. Application Data continuation of application No. 16/692,650, filed on Nov. 22, 2019, now Pat. No. 10,763,991, which is a continuation of application No. PCT/SE2017/050710, filed on Jun. 27, 2017.

(51) Int. Cl.
  *H04L 1/1812* (2023.01)
  *H04L 1/1829* (2023.01)
  *H04W 72/23* (2023.01)

(52) U.S. Cl.
  CPC .......... *H04L 1/1812* (2013.01); *H04L 1/1861* (2013.01); *H04W 72/23* (2023.01)

(58) Field of Classification Search
  CPC ... H04L 1/0073; H04L 1/1664; H04L 5/0053; H04L 5/0091; H04L 1/0026; H04W 72/23
  See application file for complete search history.

(56) References Cited

U.S. PATENT DOCUMENTS

| | | | |
|---|---|---|---|
| 2010/0182973 A1* | 7/2010 | Kim | H04W 72/541 |
| | | | 370/329 |
| 2011/0300849 A1 | 12/2011 | Chan | |
| 2011/0317615 A1 | 12/2011 | Soong et al. | |
| 2012/0281578 A1 | 11/2012 | Hong et al. | |
| 2013/0016687 A1 | 1/2013 | Yang et al. | |
| 2013/0148592 A1 | 6/2013 | Noh et al. | |
| 2013/0286884 A1 | 10/2013 | Li et al. | |
| 2014/0341151 A1* | 11/2014 | Yang | H04W 72/21 |
| | | | 370/329 |
| 2015/0156762 A1* | 6/2015 | Hwang | H04W 72/21 |
| | | | 370/329 |
| 2015/0245336 A1 | 8/2015 | Noh et al. | |
| 2016/0234830 A1 | 8/2016 | Kim et al. | |
| 2016/0262182 A1 | 9/2016 | Yang et al. | |
| 2017/0026958 A1 | 1/2017 | Noh et al. | |
| 2018/0019843 A1 | 1/2018 | Papasakellariou et al. | |
| 2018/0077698 A1* | 3/2018 | Takeda | H04L 1/1854 |
| 2018/0102892 A1* | 4/2018 | Lunttila | H04L 5/0055 |
| 2018/0317254 A1 | 11/2018 | Hu et al. | |
| 2018/0332577 A1 | 11/2018 | Yang et al. | |
| 2019/0045486 A1 | 2/2019 | Shimezawa | |
| 2019/0052332 A1 | 2/2019 | Shimezawa | |
| 2019/0068423 A1 | 2/2019 | Hwang et al. | |
| 2019/0109677 A1 | 4/2019 | Wang et al. | |
| 2019/0222359 A1 | 7/2019 | Yan et al. | |
| 2019/0319751 A1 | 10/2019 | Chen et al. | |
| 2020/0068556 A1 | 2/2020 | Tiirola et al. | |
| 2020/0228289 A1 | 7/2020 | He et al. | |
| 2020/0236712 A1 | 7/2020 | Kwak et al. | |
| 2020/0275473 A1 | 8/2020 | Takeda et al. | |
| 2020/0314889 A1 | 10/2020 | Cirik et al. | |
| 2020/0322098 A1 | 10/2020 | Lei et al. | |
| 2021/0204282 A1 | 7/2021 | Lee et al. | |
| 2021/0377927 A1* | 12/2021 | Kusashima | H04W 72/23 |

FOREIGN PATENT DOCUMENTS

| | | |
|---|---|---|
| EP | 2536050 A2 | 12/2012 |
| JP | 2005518140 A | 6/2005 |
| JP | 2013520069 A | 5/2013 |
| JP | 2017539182 A | 12/2017 |
| KR | 20110093725 | 8/2011 |
| WO | 03069822 A2 | 8/2003 |
| WO | 2016093600 A1 | 6/2016 |

OTHER PUBLICATIONS

3GPP Draft; RI-1711495, 3rd Generation Partnership Project (3GPP), Mobile Competence Centre ; 650, Route Des Lucioles ; F-06921 Sophia-Antipolis Cedex ; FRANCE; vol. RAN WGI, No. Qingdao, China; Jun. 27, 2017-Jun. 30, 2017; Jun. 17, 2017 (Jun. 17, 2017), XP051305623; consisting of 4 pages.

3GPP Draft; RI-1711104, 3rd Generation Partnership Project (3GPP), Mobile Competence Centre ; 650, Route Des Lucioles ; F-06921 Sophia-Antipolis Cedex ; FRANCE vol. RAN WGI , No. Qingdao, P.R. China; Jun. 27, 2017-Jun. 30, 2017 Jun. 26, 2017 (Jun. 26, 2017), XP051300304; consisting of 4 pages.

Korean Notice of Preliminary Rejection with English Summary Translation dated Mar. 17, 2021 for Korean Patent Application No. 2020-7001026, consisting of 11-pages.

Japanese office Action with English Summary Translation dated Apr. 13, 2021 for Patent Application No. 2019-571067, consisting of 18-pages.

3GPP TSG RAN WG1 NR Ad-Hoc Meeting R1-1709963; Title: UCI piggyback on PUSCH; Agenda Item: 5.1.3.2.5.1; Source: Huawei, HiSilicon; Document for: Discussion and decision; Date and Location: Jun. 27-30, 2017, Qingdao, China, consisting of 4-pages.

EPO Communication dated Sep. 10, 2021 for Patent Application No. 17737071.5, consisting of 8-pages.

3GPP TSG RAN WG1 NR Ad-Hoc#2 R1-1710952; Title: Considerations on UCI transmission on PUSCH; Agenda Item: 5.1.3.2.5.1; Source: InterDigital Inc.; Document for: Discussion and Decision; Date and Location: Jun. 27-30, 2017, Qingdao, P.R. China, consisting of 4-pages.

Chinese Office Action with English Summary Translation dated Oct. 9, 2021 for Patent Application No. 201780092588.X, consisting of 12-pages.

Japanese Office Action with English Summary Translation dated Mar. 15, 2022 for Patent Application No. 2019571067, consisting of 8-pages.

Japanese Notice of Allowance with English machine translation dated Oct. 4, 2022 for Patent Application No. 2019571067, consisting of 5-pages.

* cited by examiner

FEEDBACK SIGNALING FORMAT SELECTION

CROSS-REFERENCE TO RELATED APPLICATIONS

This application is a continuation of U.S. application Ser. No. 16/933,389, filed Jul. 20, 2020, which is a continuation of U.S. application Ser. No. 16/692,650, filed Nov. 22, 2019, now Issued U.S. Pat. No. 10,763,991, which is a continuation of International Application No. PCT/SE2017/050710, filed Jun. 27, 2017, the entireties of all of which are incorporated herein by reference.

FIELD

This disclosure pertains to wireless communication technology, in particular in the context of feedback signaling in a radio access network (RAN).

BACKGROUND

In modern communication systems, feedback signaling is provided in a network for improved communication. Such feedback signaling may for example comprise measurement report signaling and/or acknowledgement signaling, e.g. in the context of acknowledgement processes. Based on feedback signaling, it may for example be determined whether data elements like data blocks (e.g., transport blocks or code blocks) have to be retransmitted (e.g., in the context of acknowledgement signaling processing), or which transmission mode/operational characteristics are suitable for reported channel conditions (e.g., in the context of measurement reporting). Feedback signaling is usually not provided as only transmission in a given transmission timing structure, but in parallel and/or multiplexed (e.g., time and/or frequency multiplexed) with other transmissions or signaling, e.g. data transmission and/or other control signaling. Moreover, feedback signaling may pertain to a plurality of different and changing processes, accordingly, it may be quite variable (e.g., in size) over time, for example between different occurrences and/or different transmission timing structures like slots or subframes.

SUMMARY

An object of this disclosure is to provide approaches allowing improved handling of feedback signaling, in particular in the context of radio access networks. The approaches may in particular enable reliable and predictable handling of feedback signaling, respectively corresponding signaling structures. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardization organization). A suitable RAN may in particular be a RAN according to NR, for example release 15 or later, or LTE Evolution.

Accordingly, there is disclosed a method of operating a user equipment in a radio access network. The method comprises transmitting control information utilizing a control information format, the control information format being selected from a plurality of different control information formats based on a format indication. The method may comprise selecting the control information format.

Also, a user equipment (UE) for a radio access network is described. The user equipment is adapted for transmitting control information utilizing a control information format. The control information format is selected from a plurality of different control information formats based on a format indication. The user equipment may comprise, and/or be adapted for utilizing, processing circuitry and/or radio circuitry, in particular a transceiver and/or transmitter and/or receiver, for the transmitting and/or selection and/or receiving the indication. Alternatively, or additionally, the UE may comprise a corresponding transmitting module and/or receiving module and/or selecting module for such transmitting and/or receiving and/or selecting, respectively.

A method of operating a radio node in a radio access network may be considered. The method comprises configuring a user equipment with a format indication indicating a control information format for selection from a plurality of different control information formats. The control information format is a format for transmission of control information. The radio node may in particular be a network node, for example an eNodeB or gNodeB.

In addition, a radio node for a radio access network is proposed. The radio node is adapted for configuring a user equipment with a format indication indicating a control information format for selection from a plurality of different control information formats. The control information format is a format for transmission of control information. The radio node may comprise, and/or be adapted for utilizing, processing circuitry and/or radio circuitry, in particular a transceiver and/or transmitter and/or receiver, for the configuring, and/or associated transmitting, and/or determining the format indication. Alternatively, or additionally, the radio node may comprise a corresponding configuring module and/or transmitting module and/or receiving module and/or determining module for such configuring and/or transmitting and/or determining and/or receiving, respectively. The radio node may in particular be a network node, for example an eNodeB or gNodeB.

Alternatively, or additionally, there may be considered a method of operating a receiving radio node in a radio access network. The method may comprise receiving control information based on a format indication as described herein. The method may be part of a method of operating a radio node as described herein. The receiving radio node may in particular be a network node, for example an eNodeB or gNodeB.

Furthermore, a receiving radio node for a radio access network is proposed. The receiving radio node may be adapted for receiving control information based on a format indication as described herein. The receiving node may be a radio node as described herein. It may be considered that receiving radio node may be a network node, for example an eNodeB or gNodeB. The receiving radio node may comprise, and/or be adapted for utilizing, processing circuitry and/or radio circuitry, in particular a transceiver and/or transmitter and/or receiver, determining the format indication and/or for receiving the control information. Alternatively, or additionally, the radio node may comprise a corresponding determining module and/or receiving module for such determining and/or receiving, respectively.

An indication may generally comprise one or more subindications, and/or represent one or more parameters, e.g. a set of parameters. A subindication or subindicator may represent one or more of these parameters. An indicator or subindicator may be considered an implementation of an associated (sub)indication, e.g. as pointer or index or bit pattern or parameter value.

It may be considered that information carried or represented by feedback signaling is feedback information, e.g.

pertaining to measurement reporting and/or in particular to acknowledgement signaling. Information carried or represented by measurement signaling (also referred to as measurement reporting or measurement report, or corresponding signaling) may be considered measurement information. Information may generally be represented by a bit pattern (which may generally comprise one or more bits).

Selecting a format may generally comprise determining the format indication, for example one or more subindications or subindicators.

Receiving control information based on a format indication may comprise associating the control information based on the format, with signaling, e.g. on determined or configured resources, and/or assuming that the control information has the format indicated, and/or performing decoding and/or demodulating of received signaling based on such assumption and/or associating received signaling to the format indicated. Receiving control information may generally comprise receiving corresponding signaling or a corresponding transmission, and/or scheduling for such reception, e.g. by configuring radio circuitry accordingly.

A control information format may generally indicate a format of the control information, and/or corresponding signaling. A format may generally indicate and/or define one or more parameters for transmission, and/or for preparing the transmission. Preparing a transmission may be considered as part of transmitting in the context of this disclosure. Preparing a transmission may comprise encoding and/or modulating and/or assigning resource/s, in particular resource elements, for the transmission. The format may indicate and/or define how the control information (in particular, bits representing the control information), and optionally error encoding bits, are mapped to resource/s for transmission, e.g. by puncturing or rate-matching, in particular in the context of multiplexing the control information transmission with other transmission, e.g. data transmission. It may be considered that the control information format indicates the size of the transmission, respectively control information, e.g. in bits and/or resource element/s. In some variants, the control information may comprise padding information, e.g. padding bits, to have a size indicated by a format. This may be particularly relevant if the number of bits associated to control information represented by feedback signaling, in particular acknowledgment signaling, is smaller than the indicated size.

A format may indicate or define a channel and/or resources associated thereto, e.g. a shared channel, for multiplexing (e.g. based on puncturing or rate-matching) the control information.

Generally, it may be considered that a format indicates and/or defines resource/s for transmission of control information (which may generally be referred to a control information signaling or control signaling). The transmission may be uplink transmission, or in some cases sidelink transmission.

Data transmission may in particular be transmission on a shared channel like a physical shared channel, e.g. PUSCH (Physical Uplink Shared Channel).

The plurality of different control information formats may be configured and/or configurable and/or predefined, e.g. partially configured or configurable, and partially predefined. Different formats may differ in at least on parameter indicated, in particular size, and/or regarding the mapping of bits, e.g. whether the bits are punctured or rate matched.

The format indication, and/or the control information format, may in some variants indicate a size of control information to be transmitted. The selection of format may be between formats of different sizes.

Generally, control information transmission may pertain to a shared channel, and/or may be transmitted on resources embedded in resources associated to a shared channel. A shared channel may for example be a data channel, and/or may in particular be a physical channel, e.g. an uplink or sidelink channel, like a PUSCH (Physical Uplink Shared Channel) or PSSCH (Physical Sidelink Shared Channel). A transmission pertaining to a channel may be on resources scheduled and/or configured for the channel (which may be associated thereto), and/or multiplexed in time and/or frequency with transmission on that channel, wherein the multiplexed transmissions may be transmitted by the same user equipment or radio node. Control information pertaining to a shared channel may be multiplexed on the channel and/or resources for the channel.

Resources embedded in resources associated to a shared channel may be resources representing a subinterval in time and frequency of time and frequency intervals represented by the resources associated to the shared channel. In particular, the embedded resources may be represented by resource elements in a resource element pattern (e.g., range or area in time/frequency space) associated to the shared channel. The control information may be mapped to the embedded resources, e.g. based on puncturing (in which information or bits associated to the shared channel and/or associated data transmission may be discarded after mapping them to the embedded resources, and/or control information may be considered to overwrite data information) or based on rate matching (in which information or bits of data and/or associated to the shared channel may be mapped around the control information respectively associated bits, such that they are not discarded).

Alternatively, or additionally, the format indication may indicate whether the transmission of control information is based on puncturing or rate-matching. In particular, the format indication may indicate a size and/or size threshold. If the size if below the indicated size threshold, in some variants puncturing may be used, in other variants rate-matching may be used, depending on use case. If the size is equal to or above the threshold, the other of puncturing and rate-matching may be used. The size threshold may be configured or configurable, or pre-defined.

A size threshold may generally be indicated e.g. in (for example, downlink or sidelink) control information, in particular explicitly with a size indicator, or implicitly. A size or size threshold may in particular be represented by a number of bits and/or be a bit-size (the number of bits in a bit pattern). It may be generally considered that a format indication comprises (as subindications/indicators) a plurality of size thresholds, e.g. two, or three (as explained above), or more. A control information size may be set based on (or equal to) a threshold if an actual size (e.g., size of determined acknowledgment information) is below the threshold. The format may be selected accordingly.

A (control information) size may in particular represent the number of bits available for, and/or to be used for, transmission of control information, in particular feedback information, especially acknowledgement information and/or measurement information. A (control information) size may be based on a number of scheduling assignments and/or acknowledgment signaling processes, and/or associated reporting types, configured or scheduled for the user equipment, and/or for which the user equipment is intended and/or scheduled and/or assumed to provide feedback, in particular acknowledgment information.

Signaling or transmission on a channel may pertain to (in particular, a single transmission or for a single transmission event) transmission and/or resources in one (single) transmission timing structure, in particular slot or mini-slot, or in some cases transmission crossing two or more such structures (in time). The transmission and/or resources may be contiguous in time, between a beginning and end, e.g. a beginning symbol and an ending symbol. The control information may be multiplexed and/or embedded therein, e.g. based on puncturing or rate-matching.

In some variants, the format indication may comprise one or more subindications. The subindications (and/or corresponding subindicators) may be determined and/or configured independently from each other, or in combination. For example, a size for control information as a first subindication (e.g., number of bits for acknowledgement signaling) may be determined based on information from scheduling assignments, whereas a size threshold (as another subindication) may be configured, e.g. by a network node, which may use higher layer signaling, or be predefined.

The format indication may indicate, and/or the format may be selected or determined, based on a modulation and coding scheme. In particular, it may be considered that a format indicating puncturing or rate-matching may be selected based on such a scheme, in some variants in addition to being based on a size and/or size threshold, and/or based on a number of coding bits used for the control information. For example, for MCS with high number of bits per symbol, e.g. QAM64, QAM128, QAM256 or higher, puncturing may be indicated, whereas for a MCS with a lower number of bits, e.g. QAM 32 and lower, rate-matching may be used; the size and coding bits may be considered in this context as well.

Generally, control information may be feedback information, in particular comprising acknowledgment information and/or measurement information. In some variants, the control information may be uplink control information like UCI (Uplink Control Information).

It may be considered that the format indication is configured by a radio node and/or determined by the user equipment, e.g. partially, depending on subindications of the format indication.

The control information may be transmitted in a Physical Uplink Shared Channel, PUSCH, transmission. Transmitting in such a transmission may comprise multiplexing and/or using resources embedded in resources associated to the PUSCH transmission, e.g. based on puncturing or rate-matching.

The format indication may comprise an indicator indicating a bit mapping scheme, wherein the indicator optionally may comprise a plurality of bits, in particular two or three bits. The bit mapping scheme may be a scheme mapping control information or associated bits to resources like resource elements, e.g. based on puncturing or rate-matching.

The (format) indication may be configured with control signaling, in particular downlink control signaling, which may comprise a scheduling grant. Such control signaling may carry the full format indication, or in some variants one or more subindications or associated subindicator/s.

Transmitting control information may include transmitting an information size indicator, which may indicate the size of the control information transmitted. A format may generally indicate whether or not an information size indicator is to be transmitted.

Generally, the format, in particular a size and/or resources to be used, may be determined based on numerology, which may be configured or configurable.

There is also disclosed a program product comprising instructions causing processing circuitry to control and/or perform a method as described herein.

Furthermore, a carrier medium arrangement carrying and/or storing a program product as disclosed herein is proposed.

The approaches described herein facilitate improved handling of control information. In particular, it is possible to avoid ambiguity (or non-coherence) regarding the format used for control information transmissions, especially in the context of feedback information or acknowledgement information. Moreover, separation of control information from data transmission, e.g. when both are multiplexed on a shared channel, is facilitated. Wrong assumption regarding the format, in particular size, of the control information may be avoided, allowing reconstruction of both control information and data information for the receiver.

BRIEF DESCRIPTION OF THE DRAWINGS

The drawings are provided to illustrate concepts and approaches described herein, and are not intended to limit their scope. The drawings comprise.

DETAILED DESCRIPTION

In the following, concepts and approaches are described in the context of exemplary NR technology by way of example. It should be noted that even in the context of NR, different terminology or different concepts may be implemented. Moreover, the concepts and approaches are described in the context of uplink transmissions. They may, however, be implemented for sidelink transmission as well.

Operation of NR as an exemplary RAN may comprise the transmission of various control information from the UE to the network. Examples of such uplink control information (UCI) are hybrid-ARQ (HARQ) acknowledgements (representing acknowledgment information or signaling), channel-state information (CSI, representing measurement information or signaling), and scheduling request (SR).

The UCI may for example be transmitted on
   a separate control channel, PUCCH (Physical Uplink Control Channel), occurring either at the end of the slot interval or during the slot interval
   multiplexed with data and transmitted on PUSCH ("UCI on PUSCH", PUSCH being an example of a shared channel).

It should be noted that slot or slot interval represent transmission timing structures for NR.

Multiplexing of UCI and data (on PUSCH) may be performed in different ways, e.g. by puncturing or rate matching.

In puncturing, data is encoded and mapped (e.g., as symbol/after modulation) by the UE to the allocated PUSCH resource elements (without considering UCI). Thereafter, UCI modulation symbols or UCI information is mapped to resource elements that should carry UCI instead, replacing the data or related symbols, which may thus be discarded.

This process is called puncturing. Puncturing will impact the performance of data reception, but as long as the number of data bits that are punctured (and "stolen" for UCI) is reasonable, the data performance degradation is modest.

An advantage of puncturing is that a receiver (e.g., gNB, network) does not need to be aware if UCI is inserted or not; even if network assumes the UE to include UCI but UI does not network can decode PUSCH data anyway. Inconsistency between the UE and network regarding UCI presence can occur due to missed DL scheduling assignment. In such a case, the network expects the UE to transmit an acknowledgement relating to a downlink data transmission indicated by the scheduling assignment, but since the UE did not receive the scheduling assignment, it will not include the expected HARQ feedback.

Figure 1:
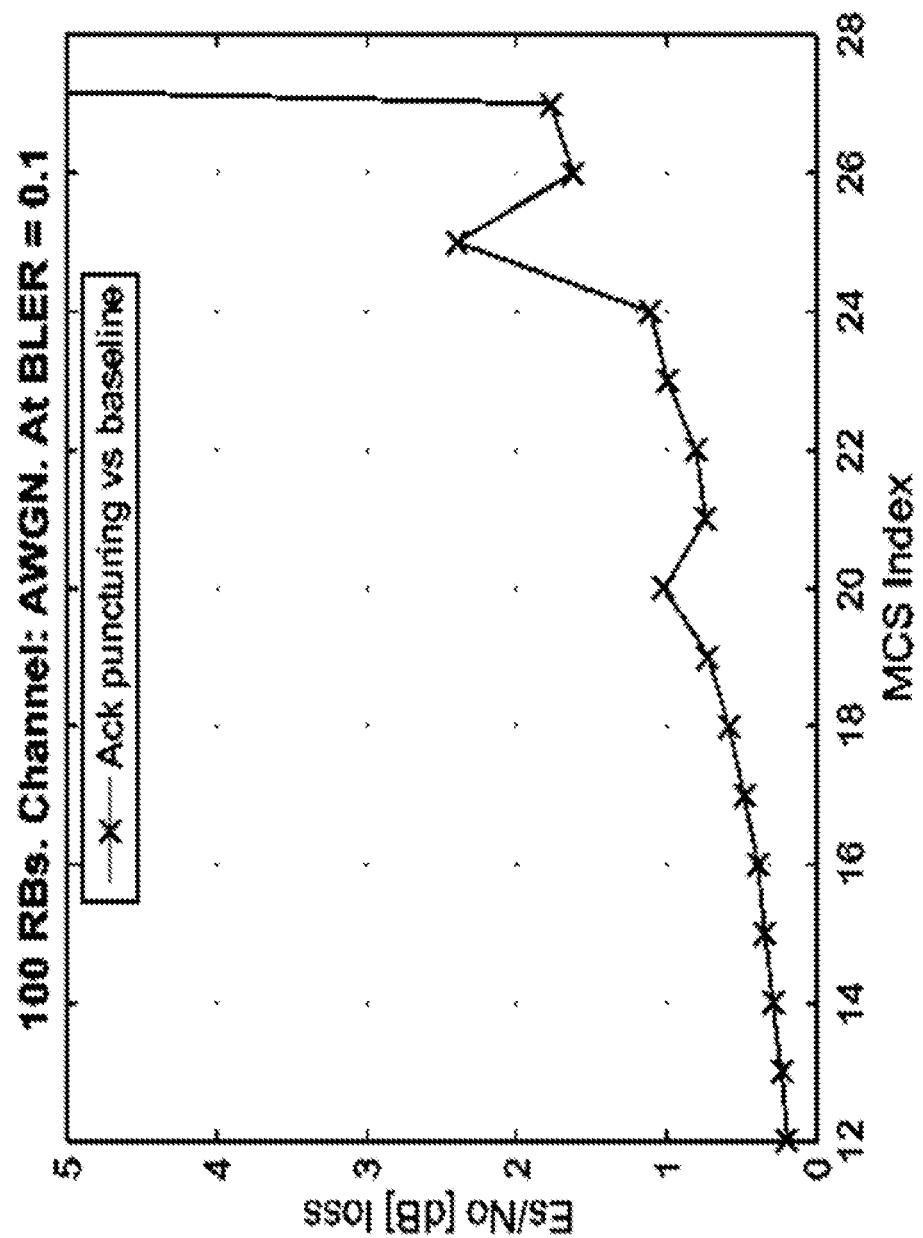
FIG. 1, showing performance loss induced by puncturing.

A drawback of puncturing is the performance loss it induces on PUSCH data. In puncturing, the coded bits of data for PUSCH (e.g., systemic and coding bits together, wherein the coding bits may be determined based on the systemic bits) mapped onto resource elements supposed to carry UCI are deleted, irrespective of the importance of the coded bits. Especially for large UCI sizes and high MCS, PUSCH data performance loss can be large. As shown in FIG. 1, performance losses of 1 dB or more can be observed for higher MCS (modulation and coding scheme) levels. FIG. 1 shows PUSCH link performance losses due to puncturing by the HARQ-ACK bits.

Rate matching adjusts the set of coded bits representing the data to "make room" for the UCI. This avoids for example that systematic bits—which are typically more important than parity bits (which are an example of coding bits)—are not transmitted. Rate matching requires the UE and network to have a coherent (unambiguous) understanding of whether UCI is present or not, and of the size of it, otherwise the network may not be able to decode the information (e.g., data and/or control information) transmitted in uplink.

As explained above, inconsistency (or incoherence, e.g. the UE and network or network node assuming different size or methods of multiplexing) between UE and network regarding UCI presence and size can occur due to missed DL scheduling assignment(s).

It is generally suggested performing puncturing PUSCH data for UCI sizes up a threshold of X bit, and rate matching PUSCH data around UCI for UCI sizes larger than X bit.

In NR, a transport block may be segmented into multiple code blocks, e.g. when the transport block size is larger than a threshold value. In transport block based HARQ feedback, a single HARQ feedback bit is returned for the complete transport block. In case of CBG-based HARQ feedback, the code blocks are collected into code block groups (CBG) and one HARQ feedback bit is reported per CBG. A CBG may comprise one or more code blocks.

If a UE is supposed to transmit UCI feedback with more than X bit, it may be expected to use rate matching. However, if the UCI amount (size) to transmit is only slightly larger than X, one or a few missed DL assignments may lead to an assumed UCI size at the UE equal to or less than X. The UE would perform puncturing, while the network would assume rate matching resulting in failed PUSCH data decoding.

There may be considered an indication in the UL grant (e.g., scheduling grant, for example either explicit or implicitly derived from other information contained in DCI, Downlink Control Information, potentially together with other information available at the UE) scheduling the UCI-containing PUSCH to instruct the UE to perform rate matching or puncturing. This indication may be considered a format indication. In particular, the indication may indicate a size to be used for the UCI. If the UE does not have enough bits available for UCI, it may pad the control information accordingly to reach the size (or, if there are too many bits for the UCI transmission, shrink the number of bits, e.g. by reducing the number of coding bits).

Different assumptions on UCI inclusion—puncturing or rate matching—may thus be avoided, averting failed PUSCH data decoding. The UL throughput may be increased and delay reduced.

Examples of explicit indication in UL grant (scheduling grant) are discussed in the following. In the following, the terms downlink assignment (or shorter DL assignment) and scheduling assignment are used interchangeably. Downlink Control Information may represent and/or indicate and/or comprise such an assignment.

An explicit indication could be included in the DCI (e.g., scheduling assignment) indicating rate matching or puncturing, e.g. as format indication or subindication. This indication could be a single bit indication or indicator (subindicator). If a scheduling assignment is missed, the UE however may perform puncturing or rate matching (if instructed by the indicator) with the wrong size. As a consequence, UE and network (respectively network node) may still assume different PUSCH-data-coded-bits to resource element mapping (incoherent formats), which in turn may lead to failed PUSCH decoding. One possible solution would be that the UE may assume as UCI size X+k bit (respectively, determines the format indication accordingly). With k=1 the assumed UCI size would be the minimum size from which on rate matching should be performed. The UCI size and/or control information size may generally indicate the number of bits (e.g., systemic bits and coding bits) used and/or scheduled for the (uplink) control information transmission, respectively the associated amount of resources, e.g. resource elements. The amount of resources may depend on the MCS used/configured for transmission. A control information format may indicate or define such size.

Alternatively, or additionally, the DL assignment(s) may contain a total DAI counter (Downlink Assignment Indicator), which may be seen as a size (sub)indicator or a format indication. The total DAI may count and/or represent and/or indicate the number of DL assignments for which the UE has been scheduled up to now and for which it should send HARQ feedback. To reduce overhead, the DAI may be taken modulo 4 and represented by 2 bits. With modulo-4, the UE can miss up to 3 consecutive DL assignments and still reconstruct the total UCI size (more generally, with a modulo-N based DAI the UE can miss up to N−1 assignments in a row). Using the DAI information, the UE can reconstruct the UCI size and perform rate matching with the correct size. It may be considered that the total DAI or a similar indicator represents the number of bits expected for acknowledgement signaling for all scheduling assignments for which feedback is to be provided with a (same) scheduled UCI transmission. This may differ from the number of scheduling assignments, e.g. for different reporting types associated to different scheduling assignments or associated acknowledgement signaling processes (e.g., HARQ processes).

If the UE misses too many assignments (e.g. more than 3 consecutive DL assignments using a modulo-4 based DAI), the UE may determine a UCI size that is a multiple of 4 too small. If the determined UCI size is less than X+1 (the minimum UCI size for which the UE should do puncturing), it may increase the determined UCI size (which may be referred to as Y) to Y'=Y+4n, n representing the smallest integer, so that Y'≥X+1. This assumes the UE should report 1 bit UCI per DL assignment; if it instead should report K bit per DL assignment (e.g. due to MIMO, CBG based HARQ feedback), Y should be increased to Y'=Y+4Kn (e.g., the UE missed 4n DL assignment and should report K bit per assignment).

If the UE missed the latest DL assignment(s) containing an increased total DAI, the UE may still fail to determine the correct UCI size. Instead of a 1 bit information just indicating puncturing or rate matching, the indicator in the UL grant scheduling PUSCH could be extended to indicate puncturing or rate matching with multiple UCI sizes, see Table 1.

TABLE 1

2-bit worth indicator in UL grant indicates puncturing and rate matching with different UCI sizes.

| Indicator | Action |
| --- | --- |
| 00 | Puncturing |
| 01 | Rate matching with UCI size 1 |
| 10 | Rate matching with UCI size 2 |
| 11 | Rate matching with UCI size 3 |

The UCI sizes could be an absolute number as in Table 1. Alternatively, the UCI sizes could be relative to the PUSCH size, e.g. relative to PUSCH data transport block size, and/or PUSCH time-frequency resources. The actions indicated in Table 1 are related to different formats indicated by the indicator, as they represent different UCI sizes to be used for transmission of control information. The UCI sizes may be predefined or be configured or configurable, e.g. by higher layer signaling (which generally may for example comprise MAC and/or RRC, Radio Resource Control, signaling).

Alternatively, the indicated UCI size could relate to, and/or be based on, the total DAI used in the DL assignments. The latest DAI value could be copied into the UL grant, as indicated exemplarily in Table 2.

TABLE 2

3 bit indicator in UL grant indicates puncturing and rate matching and in case of rate matching also latest DAI value.

| Indicator | Action |
| --- | --- |
| 000 | Rate matching with DAI 00 |
| 001 | Rate matching with DAI 01 |
| 010 | Rate matching with DAI 10 |
| 011 | Rate matching with DAI 11 |
| 100 | Puncturing |

In Table 2, 3 bits are used to indicate 5 code points. Instead of including the DAI itself, a compressed DAI (e.g., 4 code points compressed to 3 code points) together with the puncturing code point can be represented by 2 bits in the DCI. Alternatively, even the puncturing code point can be extended to include the DAI. In case of puncturing, the network may use the correct PUSCH-data-coded-bits to resource element mapping, but a wrong UCI size might still lead to failed UCI decoding. Therefore, including DAI (UCI size information) may be useful in the context of puncturing, see Table 3.

TABLE 3

3 bit indicator in UL grant indicates puncturing or rate matching together with latest DAI value.

| Indicator | Action |
| --- | --- |
| 000 | Rate matching with DAI 00 |
| 001 | Rate matching with DAI 01 |
| 010 | Rate matching with DAI 10 |
| 011 | Rate matching with DAI 11 |
| 100 | Puncturing with DAI 00 |
| 101 | Puncturing with DAI 01 |
| 110 | Puncturing with DAI 10 |
| 111 | Puncturing with DAI 11 |

Explicit indication in UL (using an information size indicator) is discussed in the following for an alternative or additional implementation.

If the UE determines (e.g. via the explicit indicator or implicitly) it should rate match PUSCH around UCI, it may insert at a fixed position (relative to the scheduled PUSCH resources) an information size indicator indicating the included number of UCI bits (alternatively, indicating the number of used radio resources, such as resource elements). The information size indicator has preferable a fixed size and modulation format (or its size and modulation format can be chosen out of a small set of possible sizes). The size and modulation format can also be relative to the scheduled amount of PUSCH resources and PUSCH modulation format. The receiver may first decode this indicator and based on the indicator may decodes/demodulates PUSCH data and UCI. Such an indicator may also be considered for puncturing. In case of puncturing, the UCI size information could assist the receiver in decoding UCI.

It can be considered to insert this indictor irrespective of UCI presence. If no UCI is transmitted, this indicator would have to indicate zero UCI size.

An information size indicator may be inserted/multiplexed via rate matching or puncturing. The preferable choice depends on possible error cases and size of this indicator. For example, if this indicator is always inserted (irrespective of UCI puncturing, rate matching, or even if UIC is present or not) this indicator is preferably rate matched, due to limited error cases and PUSCH performance not being degraded.

Implicit indication in UL grant may be considered. PUSCH data performance loss due to puncturing is more severe for higher order modulation, e.g. 64QAM than for QPSK or more generally PUSCH performance suffers more for high MCS (modulation and coding scheme) than for low MCS, as indicated in FIG. 1. The UE could perform puncturing if a modulation scheme (BPSK, QPSK, 16QAM, 64QAM, 256QAM, . . . ) is below a certain modulation scheme (e.g. below 64QAM) and/or below a certain code rate (e.g. 1/3). Otherwise PUSCH data may be rate matched around UCI.

Other information in the UL grant can be used as well for implicit indication of puncturing or rate matching, either alone or in combination. Other information (representing subindicator/s for the format indication) could be related to, and/or represent and/or pertain to, MIMO (Multiple Input, Multiple Output, a multi-antenna scheme) use, transport block size (the larger the transport block size, the more coding/parity bits may be available to protect PUSCH data; the format may indicate puncturing for small transport blocks and rate matching for large transport blocks).

The threshold X when to puncture or to rate match can depend on one of the implicit information, e.g. MCS. X could be lower for high MCS and higher for low MCS. This can also be combined with an explicit indication (e.g., in downlink control information as described above) to avoid error cases due to incoherent assumptions on UCI size.

Code block group (CBG) based HARQ feedback is discussed in the following. If a UE misses a DL assignment, it can not necessarily determine the number of UCI bit it should have reported for the missed assignment, especially if different DL assignments can correspond to different CBG configurations (and thus require different amount of UCI bits), which are examples of different reporting types. Accordingly, they may be considered providing multiple—one per CBG size—DAI fields. Another alternative is to have—despite different CBG configuration—a common configured value K indicating how many UCI bit should be reported per DL assignment. In case of a CBG configuration requiring more than K bit UCI compression (e.g. bundling) is applied, if only fewer bits than K should be reported padding may be applied. The DAI field/s, and/or K, may be indicated in DCI (scheduling assignments) and/or in a scheduling grant (UL grant).

Fixed sizes for coded UCI bits are discussed in the following. For cases where there may be different understanding of the UCI size (e.g., if an explicit indicator in a scheduling grant is not utilized) between the transmitter and the receiver (UE and radio node), the PUSCH data can be protected by fixing the number of coded UCI bits or resource elements needed to carry UCI, such that a format indicating the number (size) is selected.

The UCI bits may be encoded and rate matched to a fixed number of coded bits regardless of the number of UCI bits, e.g. utilizing padding or shrinking. The fixed number may be configured or configurable. In this specific example, it may be considered that no selection from a plurality of different formats is performed, but that only one format is available. However, in some cases puncturing or rate matched formats may be indicated as a plurality of formats.

The PUSCH may be rate matched to leave a number of radio resources (e.g., resource elements) to carry the fixed number of coded bits for the UCI bits. With this, the PUSCH data is protected from misalignment of the number of UCI bits between the transmitter and the receiver.

Alternatively, a set of numbers of coded UCI bits (UCI resource elements), respectively associated control information sizes (and corresponding formats) may be allowed and/or configured and/or predefined. Each number of coded UCI bits (UCI resource elements) is used for a different range of number of UCI bits (the UCI bits represent a size based on determined acknowledgement information, before optional padding). For example, the number of coded UCI bits (corresponding to a control information size) may be determined as follows:

---
if number of UCI bits < $K_1$:
  number of coded UCI bits is set to $Z_1$ (e.g. Z)
elseif number of UCI bits < $K_2$ :
  number of coded UCI bits is set to $Z_2$ (e.g. 2Z)
else
  number of coded UCI bits is set to $Z_3$ (e.g. 3Z)

---

In this variant, the receiver of the PUSCH can first assume the number of coded UCI bits is $Z_1$. If the PUSCH data does not pass its CRC checking (error decoding), the receiver can then assume the number of coded UCI bits is $Z_2$ and reprocesses the received PUSCH signal. If the PUSCH data does not pass its CRC checking, the receiver can then assume the number of coded UCI bits is $Z_3$ and reprocesses the received PUSCH signal. The different K values may be considered to represent size thresholds.

Generally, or additionally, a fixed number of coded bits (UCI resource elements, or size) may always be reserved regardless whether the transmitter has any UCI bits to transmit. When the transmitter has no UCI bits to transmit, these reserved coded bits may be set to a codeword representing all zeroes or all NACKs in a UCI. A nonlimiting example of such a codeword is an all-zero bit vector. It may be considered that such a fixed number of coded bits (UCI resource elements) may be reserved based on at least one of the MCS level, coding rate, modulation order or transport block size of the PUSCH (representing format subindications). The number of coded bits or resource elements may represent a format, and/or an associated size used or to be used for the transmission of the control information (UCI).

Often, variability in UCI size comes from HARQ ACK/NACK bits, if the UE has missed a DL assignment. Periodic CQI and aperiodic CQI (representing measurement information) triggered in the UL grant do not usually lead to incoherent understanding between UE and network. Another example of possible incoherence is aperiodic CQI triggered in a DL assignment, if the UE has missed the assignment.

In the detailed discussion, HARQ feedback (acknowledgment signaling) was primarily considered as representing UCI. However, the general idea is applicable to other UCI types, e.g. with possible size uncertainty, such as aperiodic CQI reports triggered in DL assignments. If in one PUSCH grant multiple UCI types with size uncertainty should be reported, the approaches described may be applied independently to each UCI type and/or jointly to the combined UCI information.

In above discussions, the threshold X between puncturing and rate matching has often been expressed in number of UCI bit. The threshold could also be expressed in terms of coded UCI bits or number of required resource elements to convey the UCI.

Figure 2:
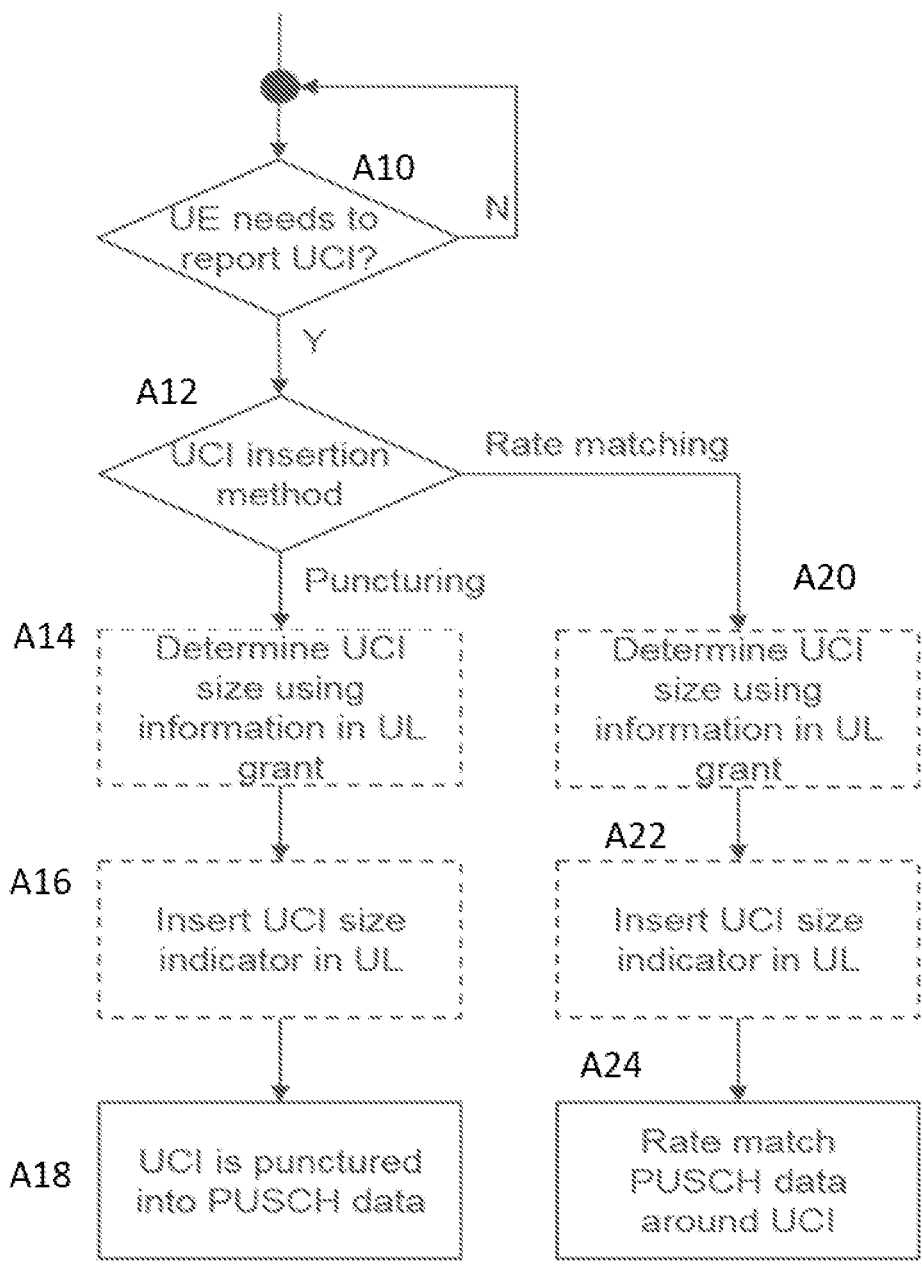
FIG. 2, showing a flowchart of an exemplary method of operating a user equipment.

FIG. 2 shows an example of a method of operating a user equipment. The method comprises an action A10 of determining whether the UE needs to transmit/report UCI as an example of control information. If yes, an insertion method may be determined, as a format for the transmission of control information. If puncturing is determined, in an action A14 the UCI size (the size of the transmission of control information, e.g. in bits, which may be coded bits) may be determined based on information in a scheduling/UL grant. In action A16, there may be optionally determined whether an information size indication like UCI size indicator indicating the size of the control information is to be transmitted or inserted into the control information or multiplexed with data, e.g. as separate transmission to the control information transmission. In action A18, the control information/UCI is punctured into PUSCH data. If in action A12 rate-matching is determined, actions A20 and A22 may be performed, analogously to actions A14 and A16. In action A24, rate matching of PUSCH data around the UCI may be performed. It should be noted that action A14 and/or A20 may be performed before or together with A12. In particular, A12 may be performed based on a determined UCI size to be used for transmission. Accordingly, the UCI size may be considered an example for a format indication.

Figure 3:
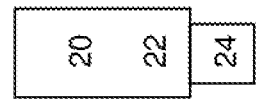
FIG. 3, showing an exemplary radio node, implemented as user equipment.

FIG. 3 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 4:
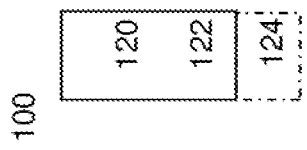
FIG. 4, showing an exemplary radio node, implemented as network node.

FIG. 4 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein.

The timing of a mini-slot may generally be configured or configurable, in particular by the network and/or a network node. The timing may be configurable to start and/or end at any symbol of the transmission timing structure, in particular one or more slots.

Transmission of data, and/or transmission on a data channel, may in particular be transmission of user data or transmission on the user plane. By multiplexing control information on such transmission, the user plane transmission may be considered to by hybridized for the control plane. Data information may be information transmitted on the data channel, and/or be represented by data bits. Bits for transmission, e.g. data bits of control information bits (representing control information) may comprise systemic information or systemic bits, which may represent the information or bits to be transmitted, and optionally coding bits, e.g. for error coding (in particular, error detection coding and/or forward error correction coding). The coding bits may be used for decoding and/or demodulating the systemic bits correctly, e.g. in the context of an acknowledgment signaling process. The content of the systemic bits may be transparent or irrelevant for the approaches described herein.

An acknowledgement signaling process and/or associated signaling and/or coding bits may be implemented pertaining to a radio layer, in particular a physical layer, or in some cases a MAC (Medium Access Control) layer.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilizing an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink communication or similar thereto.

Signaling may generally comprise one or more signals and/or one or more symbols. Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting signaling, in particular control signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol for transmitting or an ending symbol for receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1.

A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structured being neighbored by another resource structure in a domain may also be referred to as abutting and/or bordering the other resource structure in the domain.

A resource structure may generally represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilizing microwave and/or millimeter and/or other frequencies, in particular between 100 MHz or 1 GHz, and 100 GHz or 20 or 10 GHz. Such communication may utilize one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of or associated to a symbol. Accordingly, different symbols may have different symbol time lengths.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A mini-slot may be transmitted and/or received based on a configuration.

A configuration, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission and/or mini-slot may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation.

A configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

It may be considered that the scheduled transmission represents transmission on a physical channel, in particular a shared physical channel, for example a physical uplink shared channel or physical downlink shared channel. For such channels, semi-persistent configuring may be particularly suitable.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g., in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbol. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronization structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilizing resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a frequency resource range may represent a non-continuous pattern of resources. A signaling resource structure may be implemented analogously. The resource elements of a substructure may be scheduled for associated signaling. A feedback resource range may, e.g. on one or more resource elements thereof, comprise and/or be associated to feedback signaling, e.g. measurement reporting signaling and/or acknowledgement signaling. In some variants, it may comprise and/or be associated to additional signaling, e.g. control signaling and/or data signaling like user data signaling, e.g. on PUSCH. Different signalings in a feedback resource range may be distributed according to a pattern, which may be configured or configurable, e.g. with a scheduling grant or other control signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling. Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

An acknowledgement signaling process may be a process of transmitting and/or retransmitting data (e.g., in the form of data elements), based on acknowledgement signaling, e.g. acknowledgement feedback like HARQ or ARQ feedback.

Acknowledgement signaling may comprise and/or represent acknowledgement information, which may represent an acknowledgment or non-acknowledgement, e.g. of correct reception of the corresponding data or data element, and optionally may represent an indication of non-reception. In particular, acknowledgment information may represent ARQ (Automatic Repeat request) and/or HARQ (Hybrid Automatic Repeat reQuest) feedback. Correct reception may include correct decoding/demodulation, e.g. according to an ARQ or HARQ process, for example based on error detection and/or forward error correction coding, which may be based on a data element being received. Correspondingly, incorrect reception (non-acknowledgement) may refer to detection of an error during decoding/demodulating. Non-reception may indicate non-reception of a data element and/or non-reception of an acknowledgement position indication indicating a mapping pertaining to the data element. Non-reception may for example be indicated by a DTX (Discontinuous Transmission) and/or a DRX (Discontinuous Reception) indication. It should be noted that there may be DTX/DRX on either side of a communication. The radio node determining and/or transmitting the acknowledgement signaling may not receive an expected data element, and indicate this in the acknowledgement signaling as DTX, allowing more finely grained acknowledgment information. On the other hand, the radio node receiving acknowledgment signaling may not receive an expected acknowledgement signal, and treat this as a DTX event. Both kinds of DTX may be treated separately, e.g. as DTX1 and DTX2 or according to a different scheme. A data element in the context of acknowledgement signaling may in particular represent a data block like a transport block or code block, which may be subject to an acknowledgement signaling process, and one or more transmissions in the context of such a process. An acknowledgement signaling process may have associated thereto a process identifier, e.g. a process number like a HARQ process number or identifier or an ARQ process number or identifier. Acknowledgement information associated to an acknowledgement signaling process may comprise a number of bits or a bit pattern, e.g. comprising 1 or 2 bits. The bit setting may represent ACK or NACK (e.g., 1 or 0, or 11 or 00), or in some variants include DRX/DTX or similar. An acknowledgment signaling process may be associated to a data stream and/or channel or data block, and/or to a transmission in the context of a data stream and/or channel, or transmission of a data element or data block. A buffer or memory may be associated to an acknowledgement signaling process. An acknowledgement signaling process, for example a HARQ process, may comprise soft-combining and/or forward error correction and/or error detection schemes.

An acknowledgement signaling process may be associated to a reporting type. A reporting type may define and/or indicate whether the process, and/or acknowledgement information (or signaling) associated or pertaining to the process, pertain/s to a data element, e.g. to a transport block or data block, or to a plurality of subelements thereof, e.g. code blocks or groups thereof, which may be part of a (in particular, the same) transport block. Alternatively, or additionally, a reporting type may define and/or indicate how to map a bit pattern of one or more bits of the information and/or signaling. An exemplary reporting type, which may be considered to pertain to a data element or transport block, may indicate that the process or information/signaling pertains to the data element as a whole, e.g. based on error decoding performed on the data element. Another exemplary reporting type may define or indicate that the process and/or information/signaling pertains to a plurality of subelements or groups thereof, for which for example separate decoding/error decoding processes may be performed, respectively results thereof may be indicated.

A bit pattern (one or more bits) of acknowledgement information and/or associated signaling may indicate correct or incorrect reception (and/or, whether retransmission is requested/required or not) of a data element as a whole, e.g. for a reporting type pertaining to the data element as a whole. Whether a data element has been received correctly or not may be determined based on error decoding of its subelements. For example, a data element may be indicated to be received correctly if all its subelements have been received correctly. A bit pattern alternatively (or in some cases, additionally) may indicate correct or incorrect reception (and/or, whether retransmission is requested/required or not) of subelements like code blocks individually (or in groups). For example, a bit pattern of associated signaling may indicate correct or incorrect reception (and/or, whether retransmission is requested/required or not) for one or more, in particular for each, code block (or code block group) of a data element. Different acknowledgement signaling processes (in particular, HARQ processes) may have different reporting types. The mapping of a bit pattern may indicate or define which bit/s pertain to which data element or subelement.

A code block may be considered a subelement of a data element like a transport block, e.g., a transport block may comprise a one or a plurality of code blocks.

Transmission associated to an acknowledgement signaling process, and/or the associated resources or resource structure, may be configured and/or scheduled, for example by a scheduling assignment. A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Different scheduling assignments may be associated to different acknowledgement signaling processes. A scheduling assignment may indicate a reporting type of associated feedback signaling. It may generally be considered that one or more scheduling assignments are transmitted separately from a format indication, e.g. in one or more different messages, or to be separated in time and/or frequency by at least one symbol time interval and/or subcarrier. In some variants, a message may comprise more than one scheduling assignment. It may be considered in some examples that a scheduling grant is transmitted together with one or more scheduling assignments, e.g. in the same message and/or according to an associated message or signaling format. As such grants may cover a significant range of resources, receiving/decoding the scheduling assignments may still fail even if a grant is received/identified correctly. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

CBG Code Block Group
CDM Code Division Multiplex
CRC Cyclic Redundancy Check
CQI Channel Quality Information
CSI Channel State Information
DAI Downlink Assignment Indicator
DCI Downlink Control Information
DFT Discrete Fourier Transform
DM-RS Demodulation Reference Signal
FDM Frequency Division Multiplex
HARQ Hybrid Automatic Repeat Request
MCS Modulation and Coding Scheme
OFDM Orthogonal Frequency Division Multiplex
PAPR Peak to Average Power Ratio
PRB Physical Resource Block
PUCCH Physical Uplink Control Channel
PUSCH Physical Uplink Shared Channel
RRC Radio Resource Control
SR Scheduling Request
UCI Uplink Control Information
UE User Equipment Abbreviations may be considered to follow 3GPP usage if applicable.

The invention claimed is:

1. A method of operating a user equipment in a radio access network, the method comprising:
   determining a number of bits of Hybrid Acknowledgement Repeat Request (HARQ) feedback to be transmitted, the number of bits of HARQ feedback being indicated by a total Downlink Assignment Index (DAI) in a downlink assignment;
   transmitting Physical Uplink Shared Channel (PUSCH) data in a PUSCH transmission;
   determining an uplink control information (UCI) size by applying a modulo-4 operation to the total DAI;
   multiplexing the HARQ feedback in the PUSCH transmission, the PUSCH data and the HARQ feedback being multiplexed according to one of:
      puncturing the HARQ feedback into the PUSCH data based on the determined number of bits of HARQ feedback to be transmitted being less than or equal to a preconfigured size threshold; and
      rate-matching the PUSCH data around the HARQ feedback based on the determined number of bits of HARQ feedback to be transmitted being greater than the preconfigured size threshold; and
      the multiplexing the HARQ feedback in the PUSCH transmission being according to the UCI size.

2. A user equipment for a radio access network, the user equipment being configured to:
   determine a number of bits of Hybrid Acknowledgement Repeat Request (HARQ) feedback to be transmitted, the number of bits of HARQ feedback being indicated by a total Downlink Assignment Index (DAI) in a downlink assignment;
   transmit Physical Uplink Shared Channel (PUSCH) data in a PUSCH transmission;
   determine an uplink control information (UCI) size by applying a modulo-4 operation to the total DAI;
   multiplex the HARQ feedback in the PUSCH transmission, the PUSCH data and the HARQ feedback being multiplexed according to one of:
      puncture the HARQ feedback into the PUSCH data based on the determined number of bits of HARQ feedback to be transmitted being less than or equal to a preconfigured size threshold; and
      rate-match the PUSCH data around the HARQ feedback based on the determined number of bits of HARQ feedback to be transmitted being greater than the preconfigured size threshold; and
      the multiplexing the HARQ feedback in the PUSCH transmission being according to the UCI size.

3. A method of operating a radio node in a radio access network, the method comprising:
   determining a number of bits of Hybrid Acknowledgement Repeat Request (HARQ) feedback to be received, the number of bits of HARQ feedback being indicated by a total Downlink Assignment Index (DAI) in a downlink assignment;
   receiving Physical Uplink Shared Channel (PUSCH) data in a PUSCH transmission; and
   receiving HARQ feedback in the PUSCH transmission according to a HARQ feedback format according to an uplink control information (UCI) size that is determined based on a modulo-4 operation being applied to the total DAI, the PUSCH data and the HARQ feedback being multiplexed according to the UCI size and one of:
      puncturing the HARQ feedback into the PUSCH data based on the determined number of bits of HARQ feedback to be transmitted being less than or equal to a preconfigured size threshold; and
      rate-matching the PUSCH data around the HARQ feedback based on the determined number of bits of HARQ feedback to be transmitted being greater than the preconfigured size threshold.

* * * * *